(12) United States Patent
Mayordomo Vicente

(10) Patent No.: US 9,924,634 B2
(45) Date of Patent: Mar. 27, 2018

(54) DEVICE FOR MARKING NATURAL AND ARTIFICIAL GRASS AREAS

(71) Applicant: Juan Miguel Mayordomo Vicente, Barcelona (ES)

(72) Inventor: Juan Miguel Mayordomo Vicente, Barcelona (ES)

(*) Notice: Subject to any disclaimer, the term of this patent is extended or adjusted under 35 U.S.C. 154(b) by 134 days.

(21) Appl. No.: 14/672,253

(22) Filed: Mar. 30, 2015

(65) Prior Publication Data

US 2016/0286718 A1   Oct. 6, 2016

(51) Int. Cl.
| | | |
|---|---|---|
| *A01D 34/00* | (2006.01) | |
| *A01D 34/835* | (2006.01) | |
| *A01D 34/52* | (2006.01) | |
| *A01D 34/62* | (2006.01) | |
| *A63C 19/06* | (2006.01) | |

(52) U.S. Cl.
CPC ......... *A01D 34/835* (2013.01); *A01D 34/001* (2013.01); *A01D 34/52* (2013.01); *A01D 34/62* (2013.01); *A63C 19/06* (2013.01)

(58) Field of Classification Search
CPC ...... A01D 34/835; A01D 34/62; A01D 34/52; A01D 34/001
USPC .......................................................... 56/249
See application file for complete search history.

(56) References Cited

U.S. PATENT DOCUMENTS

| | | | | | |
|---|---|---|---|---|---|
| 2,662,342 | A | * | 12/1953 | Peterson ................... A01G 1/08 | 172/15 |
| 2,759,321 | A | * | 8/1956 | Force ................... A01D 34/005 | 56/12.7 |
| 3,203,160 | A | * | 8/1965 | Thomas ................ A01D 34/435 | 56/12.7 |
| 3,895,481 | A | * | 7/1975 | Olney ................... A01D 34/475 | 56/17.5 |
| 3,924,389 | A | * | 12/1975 | Kita ...................... A01D 34/008 | 56/10.2 A |
| 3,935,695 | A | * | 2/1976 | Merry ................... A01D 34/412 | 56/13.4 |
| 4,268,992 | A | * | 5/1981 | Scharf, Sr. ............. A01G 13/02 | 47/21.1 |
| 4,508,319 | A | * | 4/1985 | Tappan ............... E04H 12/2215 | 256/1 |
| 4,563,867 | A | * | 1/1986 | Bokon .................... A01D 34/52 | 56/249 |
| 4,622,746 | A | * | 11/1986 | Appelson ................. A01G 1/08 | 30/286 |

(Continued)

OTHER PUBLICATIONS

Life and Lawns, "Buckeyes Fan and the Coolest Lawn in Ohio", http://www.lifeandlawns.com/2008/01/13/update-buckeyes-fan-and-the-coolest-lawn-in-ohio/, Jan. 13, 2008.*

(Continued)

*Primary Examiner* — Thomas B Will
*Assistant Examiner* — Joan D Misa

(57) ABSTRACT

A device for marking natural and artificial grass surfaces, which comprises a mowing drum linked to a chassis, wherein the mowing drum comprises a plurality of cutting elements and can rotate around a main shaft, where a perforated sheet is arranged between the mowing drum and the grass surface, with said perforated sheet comprising a plurality of holes cut to an appropriate size so as to allow blades of grass to pass through them, in addition to an opening configured to facilitate the passage blades of grass to be cut by the cutting element.

10 Claims, 5 Drawing Sheets

(56) References Cited

U.S. PATENT DOCUMENTS

| | | | | |
|---|---|---|---|---|
| 5,291,724 A * | 3/1994 | Cotton | A01D 34/62 | 56/251 |
| 5,681,129 A * | 10/1997 | Nicodemo | A63C 19/00 | 404/72 |
| 5,950,409 A * | 9/1999 | Davies | A01D 34/62 | 56/249 |
| 6,253,533 B1 * | 7/2001 | Ehn, Jr. | A01D 34/62 | 56/198 |
| 6,301,867 B1 * | 10/2001 | Rickheim | A01D 34/62 | 56/249 |
| 7,121,073 B2 * | 10/2006 | Schmidt | A01D 34/53 | 56/10.4 |
| 8,666,550 B2 * | 3/2014 | Anderson | A01D 34/008 | 700/253 |
| 8,886,384 B2 * | 11/2014 | Chung | A01D 34/008 | 56/229 |
| 8,953,091 B2 * | 2/2015 | Hamada | G03B 13/36 | 348/349 |
| 2007/0107401 A1 * | 5/2007 | Jafarifar | A01D 34/42 | 56/12.7 |
| 2012/0085076 A1 * | 4/2012 | Mayordomo Vicente | A01D 34/62 | 56/229 |
| 2014/0230394 A1 * | 8/2014 | Zerbarini | A01D 34/52 | 56/16.7 |

OTHER PUBLICATIONS

Scythe Connection, "Co-operative Scythe Network, 350 Action", http://www.scytheconnection.com/adp/grinning/350Action.html, Feb. 23, 2011.*

Paul, Allyn, "Buckeye Fan's Super Cool Lawn", Jan. 7, 2008, Life and Lawns, http://www.lifeandlawns.com/2008/01/07/buckeye-fans-super-cool-lawn/.*

* cited by examiner

DEVICE FOR MARKING NATURAL AND ARTIFICIAL GRASS AREAS

FIELD AND BACKGROUND OF THE INVENTION

The present application seeks to register a device for marking natural and artificial grass surfaces, which includes notable innovations.

More specifically, the invention seeks to develop a simple, reliable marking device, which can operate without the use of chemical products or objects that heavily impact the condition of the grass.

The use of systems that make it possible to mark grass surfaces, whether natural or artificial, is well-known within the state of the art. Some of these systems include irons, which flatten the blades of grass in a certain area in order to create a visual contrast with the rest of the grass surface. However, such systems damage both natural and artificial grass, given that the weight of the system squashes and even breaks the grass and, in the case of natural grass, puts undue stress on the plant, thereby having a negative impact on the same. Furthermore, the result produced is not very lasting, since some blades of grass recover their natural direction of growth.

Another system known about in the state of the art comprises the use of chemical products such as paint or similar, used to mark the grass surface with colour. Nevertheless, the use of such chemical products may damage grass, particularly if it is natural and also constitute a hazard during use.

Other alternative systems include traditional lawn-mowers provided with specific blades designed to vary the angle of the cut, so as to make certain surfaces stand out in comparison to the rest of the grass surface. These solutions are nevertheless difficult to control and the blades, difficult to handle. As such, the desired surface cannot be well-differentiated from the rest of the grass surface.

SUMMARY OF THE INVENTION

The present invention was developed with the aim of providing a marking device that resolves the abovementioned limitations, in addition to contributing other, additional advantages, which shall become clear as of the description provided below.

The aim of the present invention is therefore to provide a device for marking natural and artificial surfaces, which comprises a mowing drum linked to a chassis, wherein the mowing drum comprises at least a cutting element that may rotate around a main shaft, where a perforated sheet is arranged between the mowing drum and the grass surface, with said perforated sheet comprising at least one hole cut to an appropriate size so as to allow at least one blade of grass to pass through it, in addition to an opening configured to facilitate the passage of at least one blade of grass to be cut by the cutting element.

The characteristics described above provide a marking device that does not require the use of irons to flatten the grass or stress the blades, nor the use of chemical products or complex systems that require the angle of the blades in a grass cutting machine to be altered. The perforated sheet facilitates the passage of blades of grass, thereby reducing the stress placed on the plant considerably. Furthermore, in the case of artificial grass, it significantly reduces permanent damage to the fibres that simulate natural grass. The grass is marked as a result of the guide effect provided by the openings in the perforated sheet. As the marking device passes over the blades of grass to be cut, the same enter into the openings in the perforated sheet and, as the device continues to travel along the grass surface, are deformed slightly and temporarily, until the mowing drum cuts these blades in the opening at a certain angle relative to the grass stem.

The perforated sheet preferably comprises a plurality of oval shaped openings. This is the most preferred shape, since it improves the penetration of blades of grass into the opening as the marking device moves forwards. The openings may additionally be triangular, rectangular or circular in shape, for example.

The chassis advantageously comprises a number of rolling elements, driven in a reversible manner with a motor, just like the mowing drum.

According to another advantageous characteristic of the invention, the perforated sheet may be moved relative to the mowing drum, in the same forwards-moving direction as the marking device. This makes it possible to adjust the angle at which the cutting element in the mowing drum cuts the blades of grass, thereby making it possible to alter the type of visual markings made on the grass surface to be cut.

In order to prevent additional weight, which may damage the grass, from being added, the perforated sheet may advantageously be made from a plastic or metal material.

Other characteristics and advantages of the marking device object of the present invention shall become clear as of the description of a preferred, non-exclusive embodiment, set out by way of a non-limiting illustration in the drawings attached.

DESCRIPTION OF SPECIFIC EMBODIMENTS OF THE INVENTION

The Figures attached illustrate a preferred but non-exclusive embodiment of a marking device 1 for marking natural and artificial grass surfaces, object of the present invention.

Figure 6:
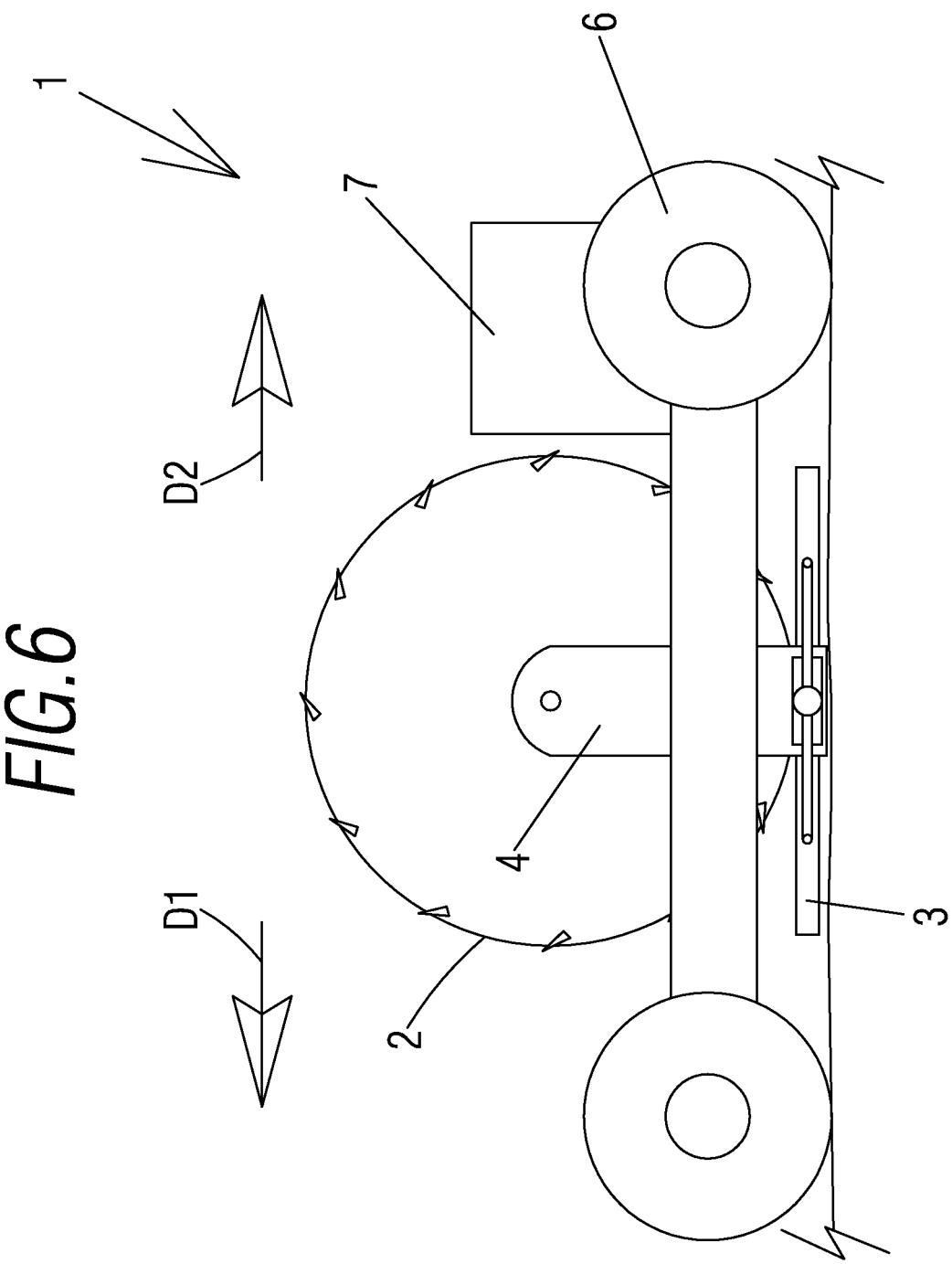
FIG. 6—Is a schematic side view of a marking device according to the invention.
Figure 7:
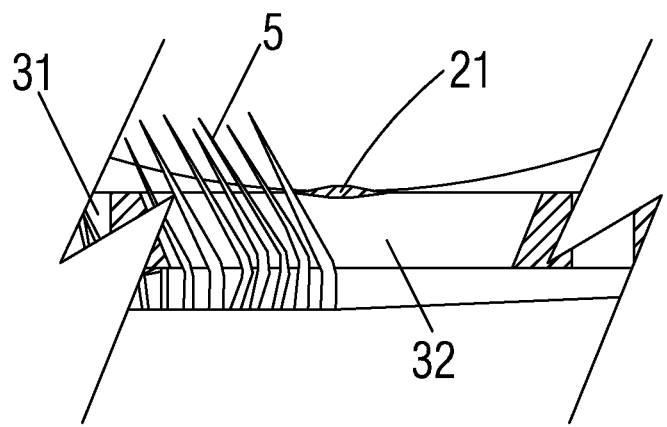
FIG. 7—Is a schematic view of the detail shown in FIG. 3, wherein the cutting elements have an alternative design.

In FIG. 6, it is possible to observe that said marking device 1 comprises a mowing drum 2 linked to a chassis 4, where the mowing drum 2 preferably comprises a plurality of cutting elements 21 arranged around the edge of the mowing drum 2. In the present embodiment, said cutting element 21 is a knife, although replacing this cutting element 21 with any other type of cutting means, which may comprise objects with a cutting edge capable of mowing the grass 5, would prove obvious to an expert skilled in the art.

The mowing drum 2 may rotate around a main shaft 22 and adopt the most suitable rotational direction according to the situation, as selected by the user.

Figure 1:
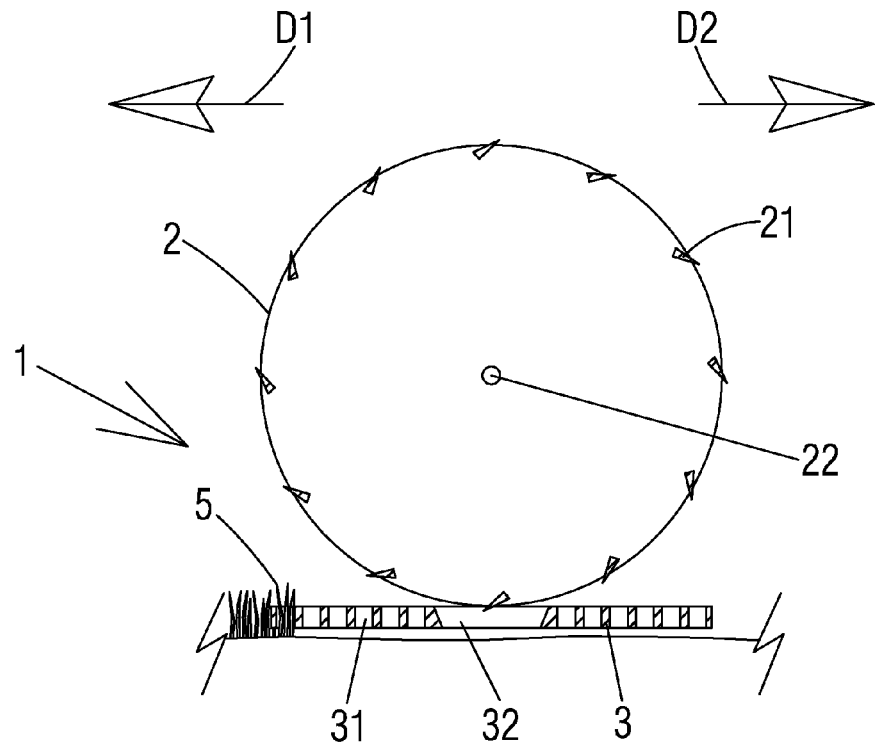
FIG. 1—Is a schematic, cross-sectional plan view of a mowing drum and perforated sheet according to the invention, during a first mowing stage.
Figure 2:
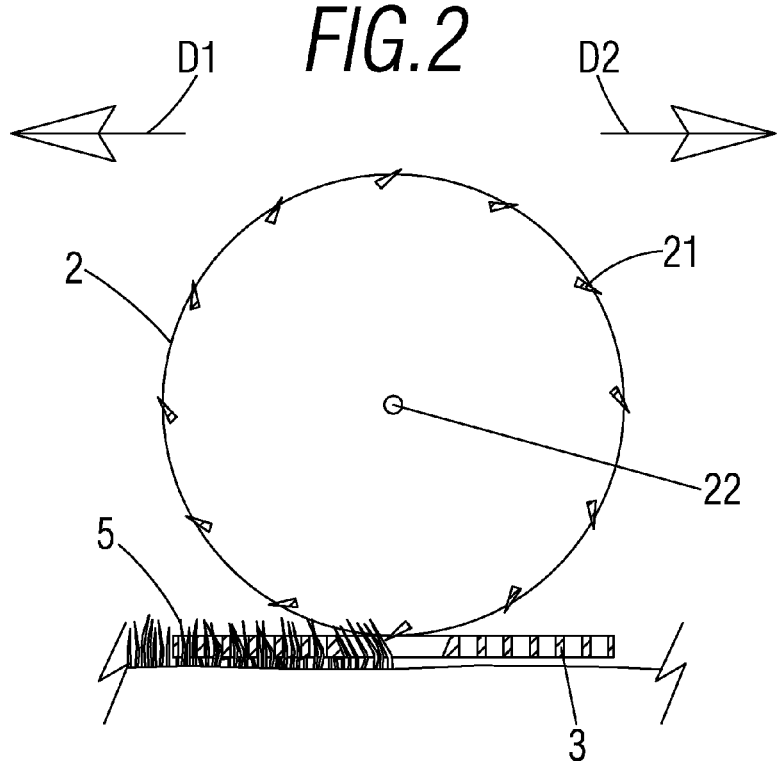
FIG. 2—Is a schematic, longitudinal section view of FIG. 1, in a subsequent mowing stage.
Figure 3:
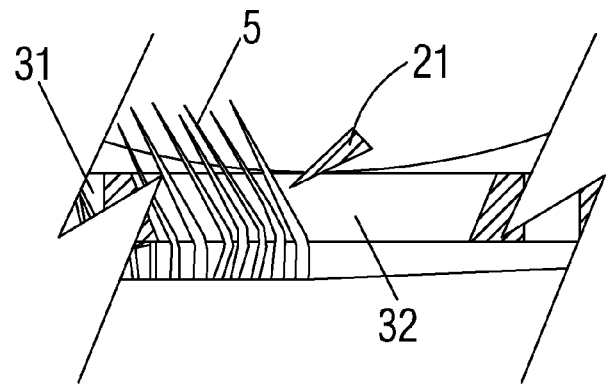
FIG. 3—Is a schematic view of a detail of the grass about to be mowed in FIG. 2.
Figure 4:
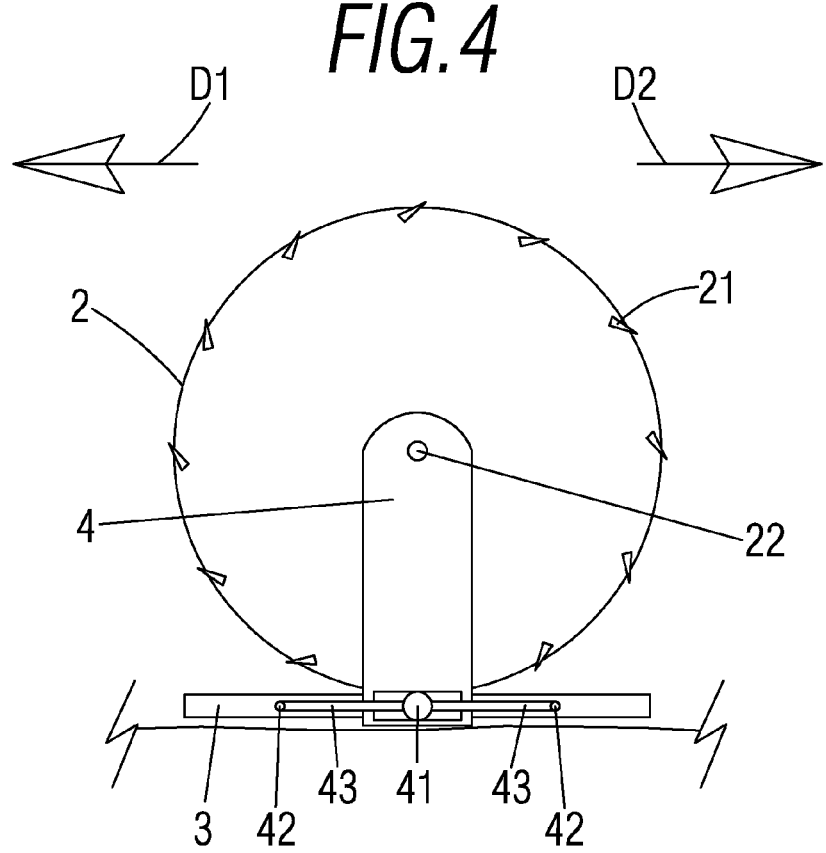
FIG. 4—Is a schematic view of a mowing drum and perforated sheet, which may be moved in relation to the mowing drum according to the invention.
Figure 5:
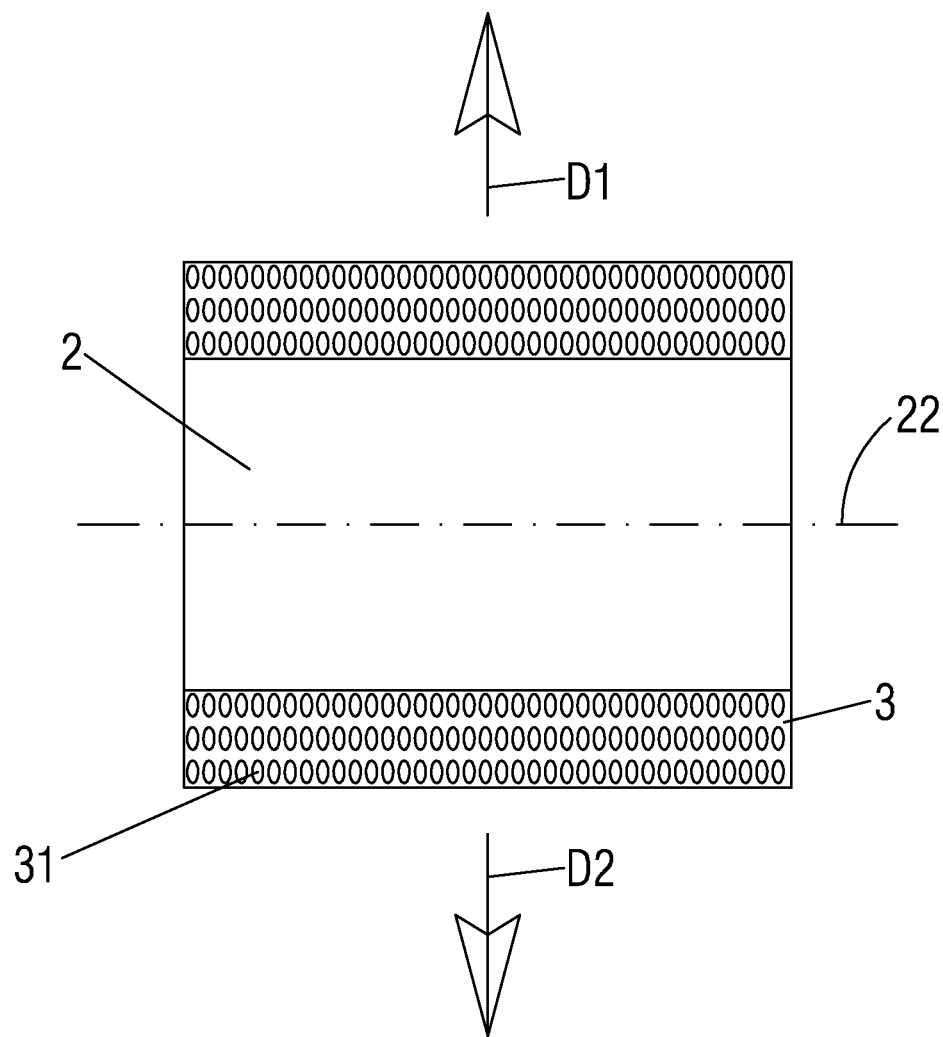
FIG. 5—Is a schematic plan view of a mowing drum and perforated sheet according to the invention.

In FIGS. 1-7, it is possible to observe a perforated sheet 3 arranged between the mowing drum 2 and the grass 5 surface, where the perforated sheet 2 comprises a plurality of holes 31, the size of which is designed to facilitate the passing of the blades of grass 5. FIG. 5 shows that, in the present embodiment, the plurality of holes 31 are oval in shape, although experts skilled in the art may opt for other shapes not illustrated herein, for example triangular, rectangular or rounded holes. As already mentioned, the oval shape offers greater grass 5 penetration than other shapes.

The perforated sheet 3 also comprises an opening 32, which the blades of grass 5 to be cut, which have already been bent away from their original position by means of the holes 31, can pass through. This opening 32 makes it possible for the cutting elements 21 to mow the blades of grass 5.

In the present embodiment, there is just one single mowing drum 2 and one single perforated sheet 3, although several drums may also be implemented to work in parallel or even in series, in addition to a plurality of perforated sheets 3 linked to one another (these constitute alternative embodiments which have not been represented).

In order to facilitate transportation of the marking device 1, the chassis 4 comprises a number of rolling elements 6, which are preferably driven in a reversible manner by a motor 7, just like the mowing drum 2. The motor may be of a known variety, for example an electric motor, combustion engine or gear system (not shown), including any other motor available on the market, it thereby being unnecessary to enter into further detail on this aspect of the invention.

In FIGS. 4 and 6, it is possible to observe that the perforated sheet 3 may be moved in the same forwards-moving direction D1, D2 as the mowing drum 2 in the marking device 1. As such, in the present embodiment, the chassis 4 comprises a runner mechanism, which links the perforated sheet 3 to the mowing drum 2 in a sliding manner. The runner mechanism has a handle 41, a number of rods 43 and a number of fastening pins 42, which serve to fix the rods 43 to the perforated sheet 3. The function of the same shall be explained further on. It must furthermore be noted that any system capable of automating this operation may be employed, thereby meaning users do not need to use the handle 41.

The perforated sheet 3 would generally and preferably be made from a plastic material such as polycarbonate, PET or another, similar plastic and would measure between 2 and 5 mm in thickness. The perforated sheet 3 may alternatively be made from a metal material, such as stainless steel, for example.

The drawings attached represent a relative design of the mowing drum 2 and perforated sheet 3, wherein said perforated sheet 3 protrudes from both sides of the mowing drum 2 in a forwards-moving direction D1, D2, as can be seen in the plan view provided in FIG. 5. Alternatively, this relative position may obviously be altered, for example by only making the perforated sheet 3 protrude from one side of the mowing drum 2 or ensuring that it does not protrude from either side. It is also possible to conceive an embodiment (not shown) in which the main shaft 22 is located such that it coincides with the edge of the perforated sheet 3 or just behind it when seen in plan view, in a forwards-moving direction D1 or D2. This design makes the marking device 1 much more compact, although it is not as flexible as that presented in the preferred embodiment, since the latter may travel in opposite directions.

The function of the present invention shall now be explained below, with reference to the drawings attached.

When users wish to mark a certain area of a grass 5 surface so as to distinguish it from the rest of the surface using the present invention, they must move the marking device 1 using the drive force of the motor 7, for example in the forwards-moving direction D1. However, it is possible that the marking device 1 may not include said motor 7, thus meaning the user would have to push it themselves and, with the help of a number of gear elements (not shown), transfer the movement of the rolling elements 6 to the mowing drum 2, as was the case in former grass cutting machines.

In order to facilitate handling of the present marking device 1, users may decide to select the D2 forwards-moving direction, for example when they reach the end of a pre-determined marking area, so as to thus avoid having to turn the entire marking machine 1 around, which in some cases, may be impossible due to the limited amount of space available in which to make the manoeuvre. Upon inverting the forwards-moving direction to D2, the rotational movement of the mowing drum 2 is automatically inverted as well, and the cutting elements 21 may in turn adopt the appropriate orientation, so as to mow the grass 5. As such, the cutting elements 21 may have a double cutting edge so as to facilitate this inversion in the opposite direction (see FIG. 7).

As the marking device 1 moves forwards in D1 or D2, the blades of grass 5 penetrate the first holes 31 (see FIG. 1) and, as the device continues to move, for example in D1, the perforated sheet 3 bends the blades of grass 5 by means of the succession of holes 31 in the same, which serve to gradually redirect these blades. Indeed, the number of rows of holes 31 may be adjusted to the particular requirements presented by each individual case.

As the blades of grass 5 pass through the various rows of holes 31 (see FIG. 2), these blades 5 become slightly bent in comparison to their initial, natural angle, without having to put any stress on the plant. Deriving benefit from this temporary inclination, the grass 5 is then mowed through the opening 32 as shown in the details represented in FIGS. 3 and 7. The fact that the grass is bent during mowing makes it possible to visually differentiate the grass area 5 that has been marked such that it stands out from the other areas, since once the blade of grass 5 has quickly recovers its natural angle after being cut at an angle along the length of the plant.

Furthermore, the possibility of graduating the relative position of the perforated sheet 3 in relation the mowing drum 2 enables users to obtain different cut angles and as such, different mowed areas that are easy to distinguish. Upon sliding the handle 41 along the mowing drum 2, the relative position mentioned above may be varied, since the rods 43 and pins 42 together serve to transmit the handle's 41 movement, which in turn is transformed into a relative movement of the perforated sheet 3 in the forwards-moving direction D1 or D2 relative to the mowing drum 2. As such, the contrast produced during mowing is improved.

The details, shapes, sizes and other complementary aspects of the marking device, object of the present invention, in addition to the materials used to manufacture the same, may be substituted for other such qualities as convenient, provided that they do not move away from the scope defined by the claims presented below.

What is claimed is:

1. A device for marking natural and artificial grass surfaces, which comprises a mowing drum linked to a chassis, wherein the mowing drum may rotate around a main shaft and comprises at least a cutting element, where a perforated sheet is arranged between the mowing drum and the grass surface, with said perforated sheet comprising a main opening and a plurality of holes, wherein said plurality of holes are configured to receive at least one blade of grass passing through it bending said at least one blade of grass away from its original position, wherein at least a bended blade of grass is mowed at the main opening by the cutting elements of the mowing drum.

2. The marking device according to claim 1, wherein holes of the plurality of holes of the perforated sheet have an oval shape.

3. The marking device according to claim 1, wherein holes of the plurality of holes of the perforated sheet have a triangular shape.

4. The marking device according to claim 1, wherein holes of the plurality of holes of the perforated sheet have a rectangular shape.

5. The marking device according to claim 1, wherein holes of the plurality of holes of the perforated sheet have a circular shape.

6. The marking device according to claim 1, wherein the chassis comprises a number of rolling elements.

7. The marking device according to claim 1, wherein the mowing drum and rolling elements are driven reversibly by a motor.

8. The marking device according to claim 1, wherein the perforated sheet may be moved relative to the mowing drum, in a forwards-moving direction of the marking device.

9. The marking device according to claim 1, wherein the perforated sheet is made of a plastic material.

10. The marking device according to claim 1, wherein the perforated sheet is made of a metal material.

* * * * *